United States Patent
Cendrillon et al.

(10) Patent No.: US 7,330,516 B2
(45) Date of Patent: Feb. 12, 2008

(54) POWER CONTROL METHOD FOR REMOTELY DEPLOYED COMMUNICATION SERVICE

(75) Inventors: Raphaël Jean Cendrillon, Brussels (BE); Marc Suzanne Paul Moonen, Herent (BE); Tom Bostoen, Antwerp (BE); Katleen Peggie Florimond Van Acker, Berchem (BE); Etienne Andre Hubert Van Den Bogaert, Schaarbeek (BE); Jan Sylvia Verlinden, Wommelgem (BE); Radu Suciu, Ghent (BE)

(73) Assignee: Alcatel, Paris (FR)

( * ) Notice: Subject to any disclaimer, the term of this patent is extended or adjusted under 35 U.S.C. 154(b) by 587 days.

(21) Appl. No.: 10/874,288

(22) Filed: Jun. 24, 2004

(65) Prior Publication Data

US 2004/0264559 A1 Dec. 30, 2004

(30) Foreign Application Priority Data

Jun. 25, 2003 (EP) .................................. 03291559

(51) Int. Cl.
*H04L 27/00* (2006.01)
*H04L 23/00* (2006.01)

(52) U.S. Cl. ...................................... 375/295; 375/377
(58) Field of Classification Search ................ 375/222, 375/219, 285, 396, 346, 296, 295, 130, 140, 375/141, 146, 377; 379/93.01, 416, 417, 379/414

See application file for complete search history.

(56) References Cited

U.S. PATENT DOCUMENTS 5,606,577 A * 2/1997 Grube et al. ................. 375/295
6,128,348 A * 10/2000 Kao et al. .................... 375/260
6,181,714 B1 * 1/2001 Isaksson et al. ............. 370/491
6,683,916 B1 * 1/2004 Classon et al. .............. 375/295
7,035,400 B1 * 4/2006 Gaikwad et al. ............ 379/417
2001/0031016 A1 10/2001 Seagraves
2001/0055332 A1 12/2001 Sadjapour et al.
2005/0123028 A1 * 6/2005 Cioffi et al. ................. 375/222

OTHER PUBLICATIONS

Nov. 2003 DSL Forum Talk in Paris.
T1E1.4 Contribution 2003-325 dated Dec. 8-12, 2003.
T. Starr et al, DSL Advances, Prentice-Hall (2003 Edition).
George Ginis et al, "Vectored Transmission for Digital Subscriber Line Systems", IEEE JSAC special issue on twisted-pair transmission, vol. 20, Issue 5, pp. 1085-1104, Jun. 2002.
J. M. Cioffi, Chapter 4 "Generalized Decision-Feedback Equalization for Packet Transmission with ISI and Gaussian Noise" from *Communications, Control of Signal Processing: A Tribute to Thomas Kailath* (A. Paulraj et al, Ed.), Kluwer Academic Publishers, 1997.

(Continued)

*Primary Examiner*—Tesfaldet Bocure
(74) *Attorney, Agent, or Firm*—Sughrue Mion, PLLC (57) ABSTRACT

A power control method for transceiver units conveying data over discrete tones. The method includes the steps of: determining a transmit power over a physical channel for each individual tone, such that this transmit power maximizes a weighted function of data rates achievable with this tone over the physical channel and over modeled neighboring channels, with the constraint that this transmit power conforms to a transmit power mask, summing up the data rates over the whole set of tones, adjusting the weights such that the total data rates over the modeled neighboring channels reach some target data rates, and such that the total data rate over the physical channel is maximized, with the constraint that each weight is identical over the whole set of tones.

9 Claims, 5 Drawing Sheets

OTHER PUBLICATIONS

T1E1.4 contribution 1992-203—Dec. 1, 1992.

A. Weissberger et al, "ADSL-DMT Out of Service Tests, Simplified Start-up Procedure(s), and Layer Management Protocols," Standards Project: ADSL Testing and Management, Brussels, Belgium; Sep. 16-17, 1997.

Wei Yu et al, "Distributed Multiuser Power Control for Digital Subscriber Lines", IEEE Journal on Selected Areas in Communications, vol. 20, No. 5, Jun. 2002.

* cited by examiner

POWER CONTROL METHOD FOR REMOTELY DEPLOYED COMMUNICATION SERVICE

BACKGROUND OF THE INVENTION

The present invention relates to a method for determining at least one operational transmit power over a physical channel for respective ones of at least one tone.

Such a method is already known in the art, e.g. from the article entitled "Distributed Multi-user Power Control for Digital Subscriber Lines", from Wei YU, Georges GINIS and John M. CIOFFI, published in the IEEE Journal of Selected Areas in Communications (J-SAC) of June 2002.

Spectrum management and power control are central issues in the design of interference-limited multi-user digital communication systems, such as Digital Subscriber Line (DSL) systems.

As the demand for higher data rates increases, spectrum management and power control emerge as central issues for the following two reasons: first, high-speed DSL systems are evolving toward higher frequency bands, where the crosstalk problem is more pronounced. Second, remotely deployed DSL can potentially emit strong crosstalk into neighboring lines.

Figure 1:
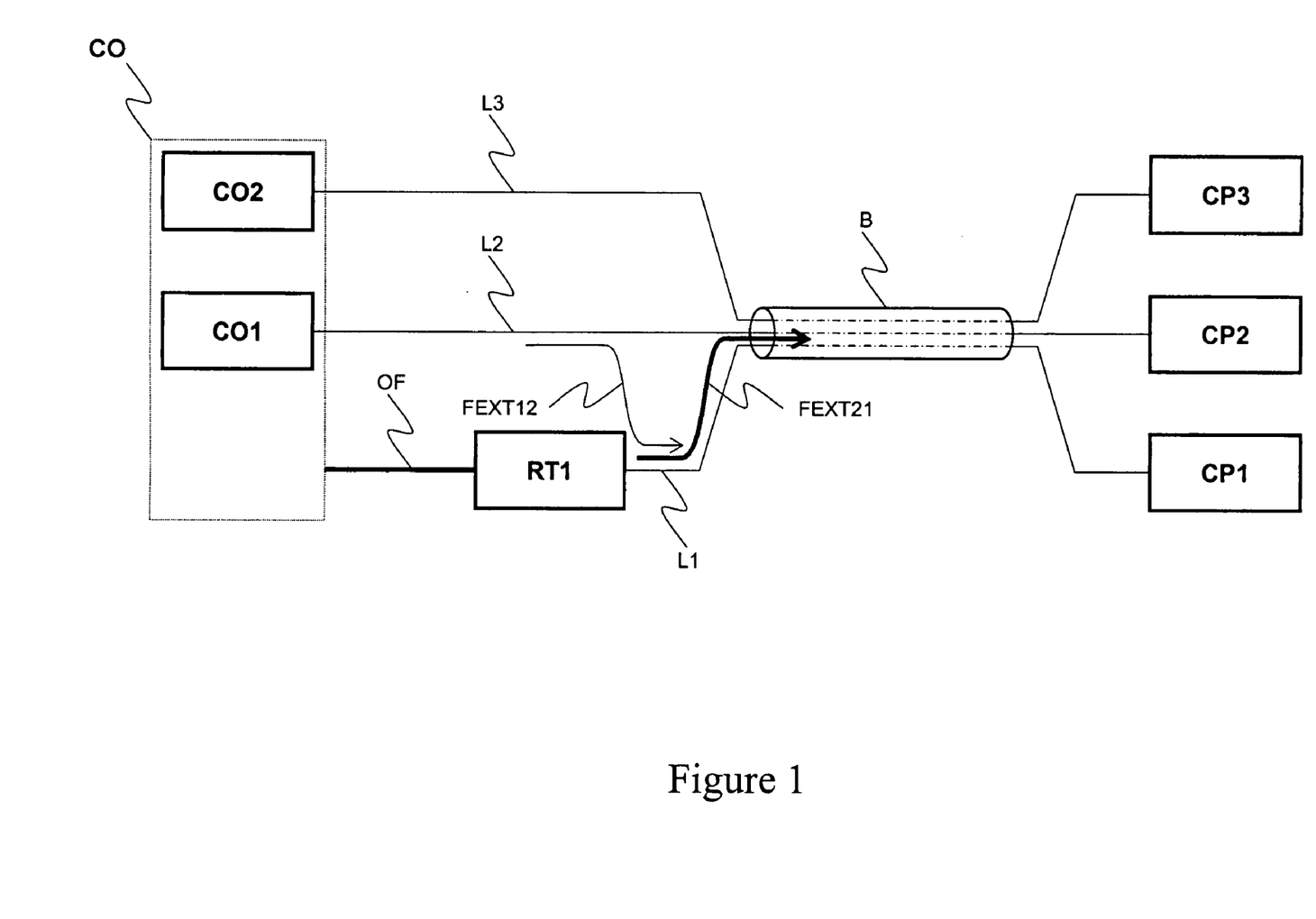
FIG. 1 represents a remotely deployed DSL system

FIG. 1 illustrates the latter issue. 3 transceiver unit pairs RT1/CP1, CO1/CP2 and CO2/CP3 are connected via twisted pairs L1, L2 and L3 respectively. The twisted pairs L1, L2 and L3 are bundled together in the binder B on the way to the central office CO. Because of their close proximity, the lines create electromagnetic interference into each other. Near-end crosstalk (NEXT) refers to crosstalk created by transmitters located on the same side as the receiver. Far-end crosstalk (FEXT) refers to crosstalk created by transmitters located on the other side. NEXT is usually much stronger than FEXT. To avoid NEXT, DSL makes use of frequency division multiplexing, wherein upstream (from customer premises) and downstream (to customer premises) signals are assigned distinct frequency bands.

In order to shorten the loop length with the purpose of increasing the data rate, the transceiver unit RT1 is deployed closer to the customer premises CP1, e.g. by means of an optical fiber OF. This is referred to as remotely or RT deployed DSL, as opposed to centrally or CO deployed DSL.

The signal from the transceiver unit CO1 is attenuated to a certain extent when it starts coupling with the line L1 in the binder B, thereby creating a weak FEXT F12. On the contrary, the signal from the transceiver unit RT1 is much stronger when it starts coupling with the line L2, thereby creating a stronger FEXT F21.

Several power control methods have been proposed in the Literature.

The cited document discloses a power control method, wherein each transceiver unit allocates power by waterfilling against the background noise and interference from other transceiver units. The power allocation of one transceiver unit affects the interference seen by other transceiver units. This in turn affects their power allocation so there is a coupling between the power allocation of the different users. Iterative waterfilling employs an iterative procedure whereby each transceiver unit waterfills in turn until a convergence point is reached.

The disclosed power control method is a realization of dynamic spectrum management. It adapts to suit the direct and crosstalk channels seen by the transceiver units in each specific deployment. The result is a much less conservative design hence higher performance.

Yet, the disclosed power control method leads to transmit Power Spectral Density (PSD) which may exceed the spectral masks defined in DSL standards. Hence, it does not satisfy spectral compatibility rules under method A. Instead, it relies on method B tests to ensure compatibility. These tests are highly complex. Furthermore, it is unclear whether spectral compatibility of iterative waterfilling under method B can be guaranteed for all deployment scenarios.

An other deficiency of the disclosed power control method is that it essentially implements flat Power Back-Off (PBO) over short loops, such as those seen on RT deployed DSL. In this scenario, it inherits all of the problems associated with flat PBO.

SUMMARY OF THE INVENTION

It is an object of the present invention to palliate those deficiencies.

According to the invention, this object is achieved due to the fact that said method comprises the steps of determining a transmit power over said physical channel for each individual tone of said at least one tone such that said transmit power maximizes a weighted function of a data rate achievable over said physical channel and over said individual tone, and at least one concurrent data rate achievable over respective ones of at least one modeled neighboring channel and over said individual tone, with the constraint that said transmit power conforms to a transmit power mask, determining therefrom a total data rate achievable over said physical channel and over said at least one tone, and at least one total concurrent data rate achievable over respective ones of said at least one modeled neighboring channel and over said at least one tone, adjusting each weight of said weighted function such that said at least one total concurrent data rate is greater than or equal to respective ones of at least one target data rate, and such that said total data rate is maximized, with the constraint that each weight of said weighted function is identical over said at least one tone, thereby determining by iteration said at least one operational transmit power.

Normally, the power allocation problem is non-convex. This results in a numerically intractable problem which cannot be solved, or cannot be solved with reasonable processing capabilities.

However, the following simplifications leads to a nearly optimal PBO solution:

Each tone of said at least one tone is considered separately in the optimization process.

The transmitted signal must conform to a transmit power mask.

Each weight of said weighted function is identical over said at least one tone.

Since the solution lies within a spectral mask, there is no issue of spectral compatibility.

This technique is amenable to autonomous implementation through the definition of a protected service (worst case-victim), which will typically be a CO deployed DSL. Yet, power allocation is still based on the channel as seen on the RT deployed DSL. As a result, the solution is not overly conservative.

Varying the desired rate for the protected service allows different tradeoffs to be achieved between reach of CO deployed DSLs and data rates of RT deployed DSLs. This trade-off can be varied to suit each geographical region. Hence, the carrier can offer the most profitable service portfolio based on the demography of customers within an area.

This technique has application for RT deployed Asymmetric DSL (ADSL) and RT deployed Very high speed asymmetric DSL (VDSL), when legacy ADSL systems must be protected. This technique achieves significant gains over traditional static spectrum management, where RT deployed VDSL is prohibited from transmitting in the ADSL band.

This technique has also application for upstream VDSL transmitters, where signal from far-end transmitters must be protected from the large crosstalk caused by near-end transmitters.

The result is a simple, autonomous PBO method applicable interalia to CO and RT deployed DSL.

The present invention also relates to a transceiver unit comprising:
  a transmitter unit adapted to transmit at least one tone over a physical channel,
  a power control unit coupled to said transmitter unit, and adapted to determine at least one operational transmit power over said physical channel for respective ones of said at least one tone.

By implementing the present power control method in said power control unit, similar objectives are achieved.

The present invention also relates to a digital communication system comprising:
  at least one transceiver unit,
  a communication adaptation module coupled to said at least one transceiver unit via a data communication network, each of said at least one transceiver unit comprising:
  a transmitter unit adapted to transmit at least one tone over a physical channel, said communication adaptation module comprising:
  a power control unit adapted to determine at least one operational transmit power over said physical channel for respective ones of said at least one tone.

By implementing the present power control method in said power control unit, similar objectives are achieved.

With this embodiment, the transceiver units are released from the burden of computing the transmit powers and processing resources saving is achieved, yet at the expense of the network resources required for centralizing the necessary information from the local entities, and of their operational autonomy.

Said data communication network stands for whatever type of network adapted to convey data between any of its ports, being a Local Area Network (LAN) such as an Ethernet bus, a Wide Area Network (WAN) such as an ATM broadband network or the Internet, etc, and irrespective of the underlying communication technology being used, being circuit-switched or packet-switched communication, being wired or wireless communication, etc.

The scope of the present invention is not limited to DSL communication systems. The present invention is applicable to whatever type of digital communication system conveying data over discrete tones, being by means of Discrete Multi-Tones (DMT) modulation, Single Carrier modulation, Code Division Multiple Access (CDMA) modulation, etc, and to whatever type of physical transmission medium, being coaxial cables, optical fibers, the atmosphere, the empty space, etc, wherein the crosstalk is a potential source of noise, not necessarily the predominant one.

Another characterizing embodiment of the present invention is that the determination of said transmit power is restricted to a pre-determined discrete set of data rates as enforced by a coding and/or modulation scheme used over said physical channel.

This simplification allows a solution to be found with lower complexity.

Another characterizing embodiment of the present invention is that said weighted function is a weighted sum.

Other mathematical functions with a weight operation, with said data rate and said at least one concurrent data rate as input, possibly with another optimization objective, can be thought of.

Further characterizing embodiments of the present invention are mentioned in the appended claims.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 2:
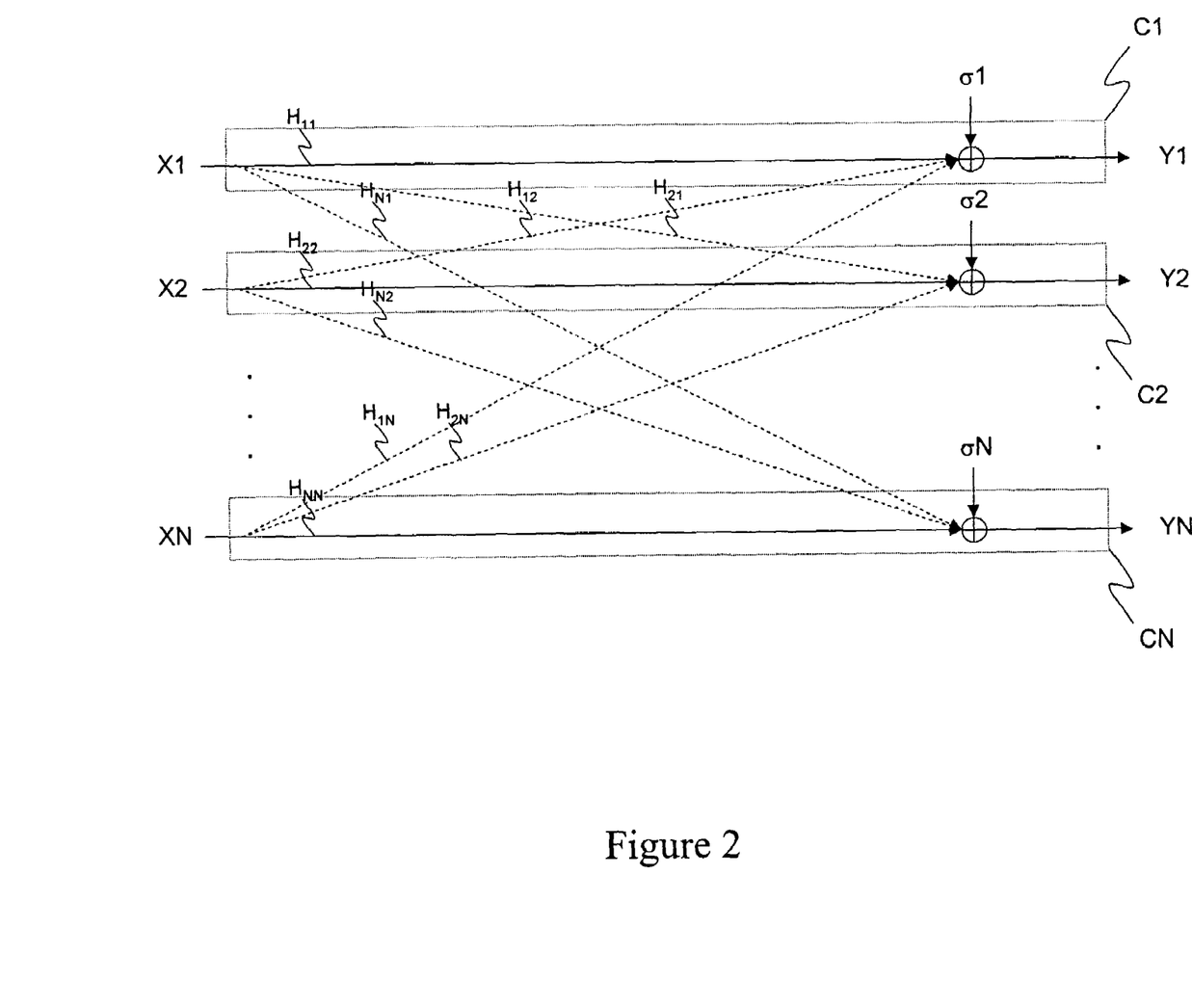
FIG. 2 represents a interference channel model.

Consider the interference channel model depicted in FIG. 2. There are N neighboring channels $C_1$ to $C_N$ connecting respective ones of N transmitters $X_1$ to $X_N$ to respective ones of N receivers $Y_1$ to $Y_N$.

Denote the direct channel transfer function from the transmitter $X_n$ to the receiver $Y_n$ as $H_{nn}$. Denote the crosstalk channel transfer function from the transmitter $X_m$ to the receiver $Y_n$ as $H_{nm}$ ($m \neq n$).

In addition to the interference, each receiver also experiences zero-mean Additive White Gaussian Noise (AWGN), the PSD of which is denoted as $\sigma_n^2$.

Denote the PSD of each transmitted signal as $S_n$.

The achievable data rate $R_n$ over the channel $C_n$ (while treating all interference as noise) is given by the Shannon Formula:

$$R_n = \int_0^{F_{max}} \log_2\left(1 + \frac{S_n(f) \cdot |H_{nn}(f)|^2}{\Gamma\left(\sigma_n^2(f) + \sum_{m \neq n} S_m(f) \cdot |H_{nm}(f)|^2\right)}\right) df \quad (1)$$

where the SNR-gap is denoted as $\Gamma$. The SNR-gap $\Gamma$ defines the gap between a practical coding and modulation scheme and the channel capacity. The SNR-gap $\Gamma$ depends on the coding and modulation scheme being used, and also on the target probability of error. At theoretical capacity, $\Gamma=0$ dB.

In one embodiment of the present invention, the signal is sampled at a sampling frequency $F_s$, which is at least twice the signal bandwidth. The signal is captured over a time window $T_c$ that matches one DMT symbol, i.e. the frequency spacing $1/T_c$ matches the tone spacing.

The achievable data rate $R_n$ is then given by:

$$R_n = \sum_{k=1}^{K} \log_2\left(1 + \frac{S_{n,k} \cdot |H_{nn,k}|^2}{\Gamma\left(\sigma_{n,k}^2 + \sum_{m \neq n} S_{m,k} \cdot |H_{nm,k}|^2\right)}\right) \frac{1}{T_c} \quad (2)$$

where:
the set of tones over which the present optimization process is conducted is denoted as $\{f_1, \ldots, f_K\}$, $f_1$ to $f_K$ being harmonic frequencies of the fundamental frequency $1/T_c$,
$S_{n,k} = S_n(f_k)$,
$H_{nm,k} = H_{nm}(f_k)$,
$\sigma_{n,k}^2 = \sigma_n^2(f_k)$.

In one embodiment of the present invention, $\{f_1, \ldots, f_K\}$ is defined by the applicable DSL standard.

In another embodiment, $\{f_1, \ldots, f_K\}$ is a subset thereof.

Denote the number of bits a particular tone $f_k$ can be loaded with over the channel $C_n$ as $B_{n,k}$.

We have:

$$B_{n,k} = \left\lfloor \log_2\left(1 + \frac{S_{n,k} \cdot |H_{nn,k}|^2}{\Gamma\left(\sigma_{n,k}^2 + \sum_{m \neq n} S_{m,k} \cdot |H_{nm,k}|^2\right)}\right) \right\rfloor \quad (3)$$

where $\lfloor x \rfloor$ rounds down to the nearest value in the set $\{b_0=0, b_1, \ldots, b_L\}$. The set $\{b_0, b_1, \ldots, b_L\}$ is the set of all possible bit loading values as defined by the applicable DMT modulation scheme.

Figure 3:
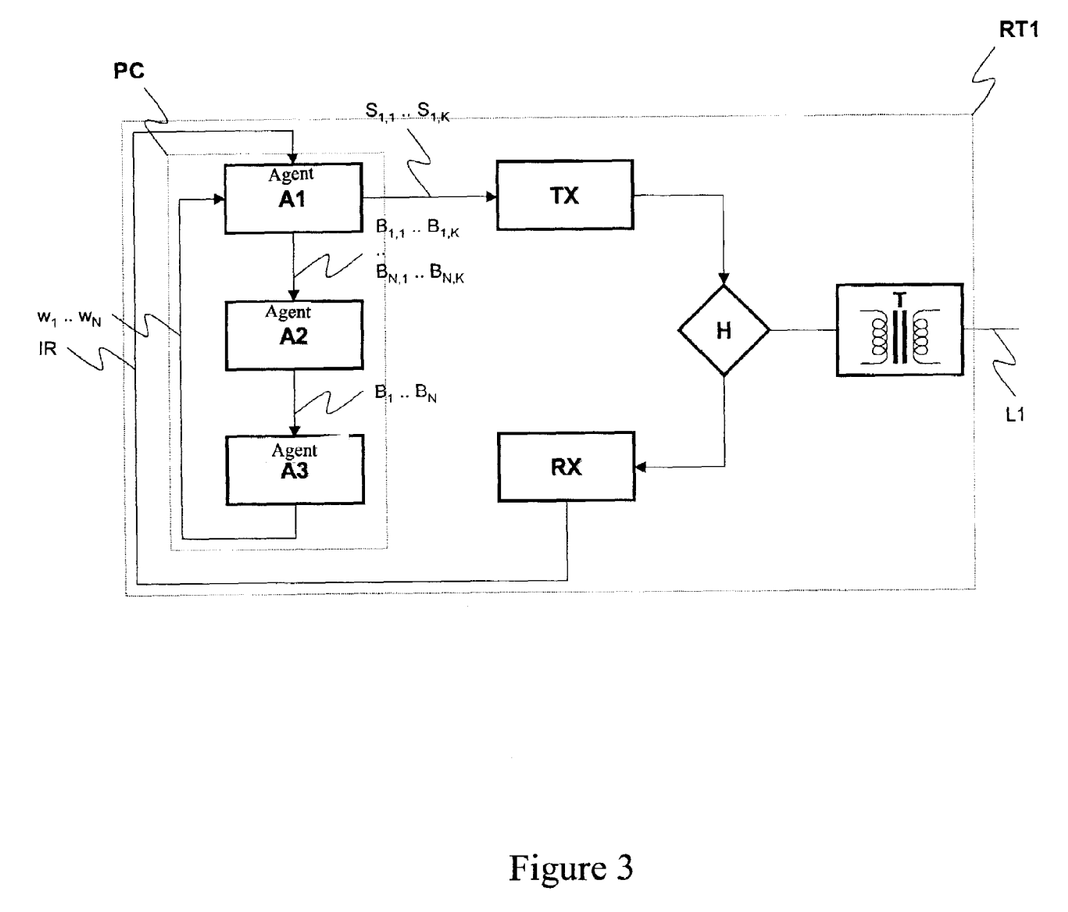
FIG. 3 represents a DSL transceiver unit according to the present invention.

FIG. 3 depicts a DSL transceiver unit RT1 adapted to transmit a DMT modulated signal over a twisted pair L1.

With respect to the present invention, the transceiver unit RT1 comprises the following functional blocks:
a power control unit PC,
a transmitter unit TX,
a receiver unit RX,
a hybrid circuit H,
a line adaptator T.

The power control unit PC is coupled to both the transmitter unit TX and the receiver unit RX. The transmitter unit TX and the receiver unit RX are both coupled to the hybrid circuit H. The hybrid circuit H is coupled to the line adaptator T.

The transmitter unit TX accommodates the necessary means for encoding user and control data and for modulating DSL tones with the so encoded data. The transmitter unit accommodates the necessary means for controlling the transmit power of each tone, as determined by the power control unit PC.

The receiver unit RX accommodates the necessary means for demodulating a DSL signal and for decoding user and control data from the so-demodulated signal.

The hybrid circuit H is adapted to couple the transmitter unit TX' output to the twisted pair L1, and the twisted pair L1 to the receiver unit RX's input. The hybrid circuit H accommodates an echo cancellation means to avoid the transmitted unit TX's signal to couple into the receiver unit RX's input.

The line adaptator T is adapted to isolate the transceiver unit RT1 from the twisted pair L1, and to adapt the input and output impedance of the transceiver unit RT1 to the line characteristic impedance.

The power control unit PC is adapted to determine by iteration the operational transmit powers of the DSL tones.

The power control unit PC comprises the following functional blocks:
a first agent A1,
a second agent A2,
a third agent A3.

The first agent A1 is coupled to the second agent A2, to the transmitter unit TX and to the receiver unit RX. The second agent A2 is coupled to the third agent A3. The third agent A3 is coupled to the first agent A1.

The first agent makes use of the foregoing interference channel model, wherein the channel $C_1$ stands for the line L1. The first agent A1 assumes then N-1 neighboring channels $C_2$ to $C_N$ interfering with the line L1.

Denote a particular bit loading out of the set $\{b_0, b_1, \ldots, b_L\}$ as $b_l$.

Denote a particular tone as $f_k$.

Denote the transmit power required to load the tone $f_k$ with $b_l$ bits over the line L1 as $S_{1,k,l}$.

We can write from the equation (3):

$$s_{1,k,l} = \frac{\sigma_{1,k}^2 + \sum_{m \neq 1} S_{m,k} \cdot |H_{1m,k}|^2}{|H_{11,k}|^2} (2^{b_l} - 1)\Gamma \quad (4)$$

The peer transceiver unit at the other end of the line L1, presently CP1, determines some channel information from measurements performed on the received signal and noise.

In one embodiment of the present invention, the first agent A1 makes uses of the transmit power and the corresponding bit loading as computed by the peer transceiver unit for the tone $f_k$, denoted as $SR_{1,k}$ and $BR_{1,k}$ respectively.

The receiver unit RX is adapted to forward those pieces of information, denoted as IR in FIG. 3, to the first agent A1.

We have:

$$\frac{\sigma_{1,k}^2 + \sum_{m \neq 1} S_{m,k} \cdot |H_{1m,k}|^2}{|H_{11,k}|^2} = \frac{1}{(2^{BR_{1,k}} - 1)\Gamma} SR_{1,k} \quad (5)$$

and:

$$s_{1,k,l} = \frac{(2^{b_l} - 1)}{(2^{BR_{1,k}} - 1)} SR_{1,k}$$

In another embodiment, the first agent A1 makes use of the noise and the direct channel transfer function as measured by the peer transceiver unit.

In still another embodiment, the first agent A1 makes use of the Channel Signal to Noise Ratio (C-SNR) as measured by the peer transceiver unit $$\left( CSNR_{1,k} = \frac{|H_{11,k}|^2}{\sigma_{1,k}^2 + \sum_{m \neq 1} S_{m,k} \cdot |H_{1m,k}|^2} \right).$$

The first agent A1 determines $S_{1,k,l}$ for all the bit loading $b_1$ to $b_L$ ($S_{1,k,o} = 0$ dB) by means of the equation (5).

A bit loading $b_l$ for which the corresponding transmit power $S_{1,k,l}$ does not conform to some pre-determined transmit power mask is discarded.

Next, the first agent A1 determines for each $S_{1,k,l}$ the bit loading achievable over the neighboring channels $C_2$ to $C_N$, denoted as $B_{2,k,l}$ to $B_{N,k,l}$ respectively.

The first agent A1 makes use of some level of knowledge regarding the neighboring systems and the transmission environment.

The following data are assumed to be preliminarily known:
- N−1 transmit PSD $S_2$ to $S_N$ for the transmitters $X_2$ to $X_N$ respectively
- N−1 noise PSD $\sigma_2^2$ to $\sigma_N^2$ for the channels $C_2$ to $C_N$ respectively,
- N−1 direct transfer function magnitudes $|H_{22}|$ to $|H_{NN}|$ for the channels $C_2$ to $C_N$ respectively,
- N−1 crosstalk transfer function magnitudes $|H_{21}|$ to $|H_{N1}|$ from the transmitter $X_1$ to the receivers $Y_2$ to $Y_N$ respectively.

In one embodiment of the present invention, those data are held in a non-volatile storage area.

In another embodiment, the transceiver unit RT1 further comprises communication means adapted to retrieve all or part of those data from a remote server.

In one embodiment of the present invention, the first agent A1 makes use of a crosstalk channel model, wherein the transfer function magnitude $|H_{m1}|$ for the tone $f_k$ is given by:

$$|H_{m1,k}|^2 = K_m \cdot f_k^2 \cdot l_B \cdot (e^{-\alpha_{m,k} \cdot l_m})^2 \quad (2 \leq m \leq N) \tag{6}$$

where:
- $K_m$ is a coupling constant between the line L1 and the channel Cm,
- the theoretical length over which the line L1 is bundled together with the channels C2 to CN is denoted as $l_B$,
- the theoretical signal attenuation of the tone $f_k$ over the channel Cm is denoted as $\alpha_{m,k}$,
- the theoretical length of the channel through which the crosstalk signal from the transmitter $X_1$ into the receiver $Y_m$ attenuates is denoted as $l_m$.

The bit loading $B_{2,k,l}$ to $B_{N,k,l}$ achievable over the neighboring channels $C_2$ to $C_N$ for a given $S_{1,k,l}$ are obtained by means of the following equation:

$$B_{m,k,l} = \left\lfloor \log_2 \left( 1 + \frac{S_{m,k} \cdot |H_{mm,k}|^2}{\Gamma(\sigma_{m,k}^2 + S_{1,k,l} \cdot |H_{ml,k}|^2)} \right) \right\rfloor \quad (2 \leq m \leq N) \tag{7}$$

combined with the equation (6)

The interference between the channels $C_2$ to $C_N$ are assumed to be included in the noise model $\sigma_m^2$.

In another embodiment, the first agent A1 makes use of another crosstalk channel model as known to a person skilled in the art.

The first agent A1 computes a weighted sum of the bit loading achievable over the line L1 and the bit loading achievable over the channels $C_2$ to $C_N$:

$$J_{k,l} = w_1 \cdot b_l + \sum_{m=2}^{N} w_m \cdot B_{m,k,l} \tag{8}$$

The first agent A1 determines the bit loading $b_{l_k}$ that maximizes the weighted sum $J_{k,l}$:

$$l_k = \arg\max_l(J_{k,l}) \tag{9}$$

The transmit power of the tone $f_k$ over the line L1 that maximizes the weighted sum $J_{k,l}$ is then given by:

$$S_{1,k} = S_{1,k,l_k} = \frac{(2^{b_{l_k}} - 1)}{(2^{bR_{1,k}} - 1)} SR_{1,k} \tag{10}$$

The corresponding bit loading over the line L1 is given by:

$$B_{1,k} = b_{l_k} \tag{11}$$

The corresponding bit loading over the channels $C_2$ to $C_N$ is given by:

$$B_{m,k} = B_{m,k,l_k} = \left\lfloor \log_2 \left( 1 + \frac{S_{m,k} \cdot |H_{mm,k}|^2}{\Gamma(\sigma_{m,k}^2 + S_{1,k,l_k} \cdot |H_{ml,k}|^2)} \right) \right\rfloor \quad (2 \leq m \leq N) \tag{12}$$

The first agent A1 re-iterates the procedure for all the tones $f_1$ to $f_K$.

The first agent A1 makes $B_{1,k}$ to $B_{N,k}$ available to the second agent A2 for all the tones $f_1$ to $f_K$, e.g. by means of a share memory area and one or more software trigger.

The second agent A2 sums up $B_{1,k}$ over all the tones $f_1$ to $f_K$, thereby determining a total bit loading $B_1$:

$$B_1 = \sum_{k=1}^{K} B_{1,k} \tag{13}$$

The second agent A2 sums up $B_{2,k}$ to $B_{N,k}$ over all the tones $f_1$ to $f_K$, thereby determining N−1 total concurrent bit loading $B_2$ to $B_N$:

$$B_m = \sum_{k=1}^{K} B_{m,k} \quad (2 \leq m \leq N) \tag{14}$$

The third agent A3 adapts the weight $w_1$ to $w_N$ such that $B_2$ to $B_N$ are respectively greater than or equal to target rates $BT_2$ to $BT_N$, and such that $B_1$ is maximized.

In one embodiment of the present invention:

$$w_1 = 1 - \sum_{m=2}^{N} w_m$$

If any of the total concurrent bit rate $B_2$ to $B_N$ is lower than its target rate then the corresponding weight is increased by dichotomy. If any of the total concurrent bit rate $B_2$ to $B_N$ is greater than its target rate then the corresponding weight is decreased by dichotomy.

In another embodiment, the third agent A3 adjust the weights $w_1$ to $w_N$ by means of another algorithm as known to a person skilled in the art.

The new weight values are made available to the first agent A1, which in turn determines new transmit powers therefrom, and so on.

The process keeps on until a convergence criteria is met, e.g. the interval wherein each weight is presently assumed to be is less than a pre-determined threshold $\epsilon$.

The third agent A3 notifies the first agent A1 of the process completion. Thereupon, the first agent A1 makes the lastly determined $S_{1,k}$ available to the transmitter unit TX for all the tones $f_1$ to $f_K$.

The transmitter unit TX applies the transmit power $S_{1,1}$ to $S_{1,K}$ to the tones $f_1$ to $f_K$ respectively.

It would be apparent to a person skilled in the art that bit loading or bit rate could have been be used interchangeably (actually, the bit loading is the number of bits a tone conveys over a DMT symbol period).

Figure 4:
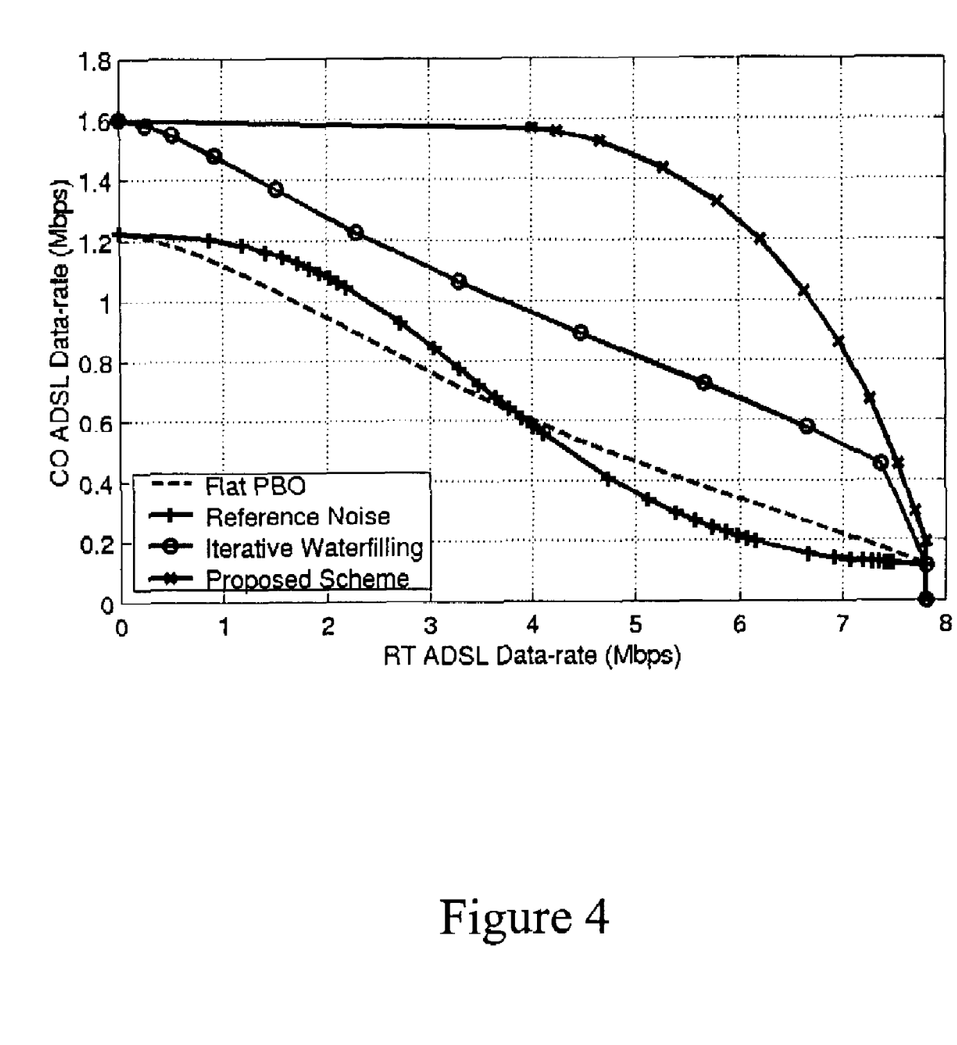
FIG. 4 represents the rate regions of different PBO methods, including the proposed scheme.

FIG. 4 represents the rate regions of different PBO methods, including the proposed scheme. In this numerical analysis, PBO is assumed to be applied to a RT deployed ADSL interfering with a CO deployed ADSL. The proposed scheme achieves significant performance gains over existing methods: with 1 Mbps as target data rate on the CO deployed ADSL, the RT deployed ADSL achieves 1,7 Mbps with flat PBO, 2,4 Mbps with reference noise, 3,7 Mbps with iterative waterfilling and 6,7 Mbps with the proposed scheme.

Figure 5:
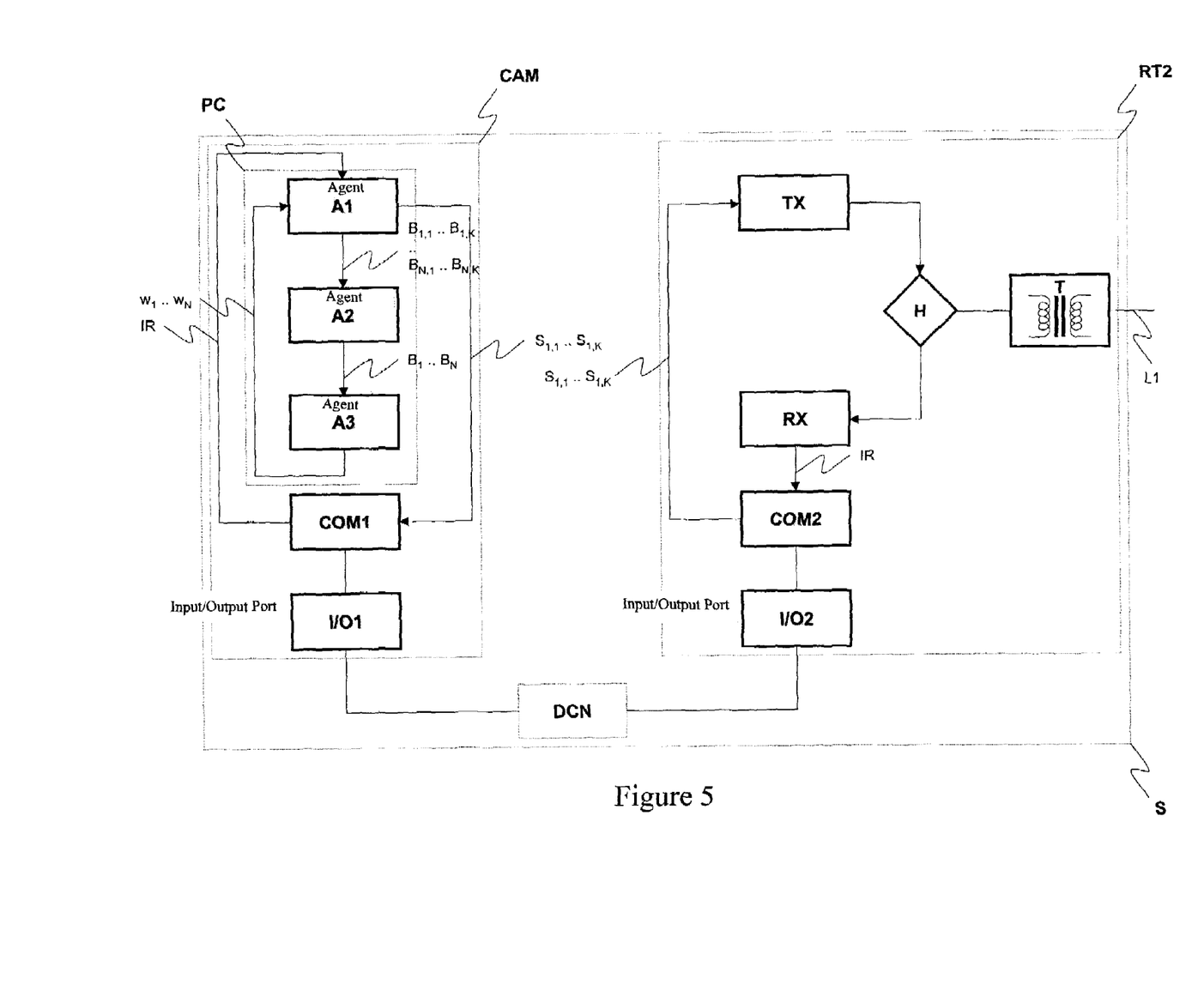
FIG. 5 represents a DSL communication system according to the present invention.

Another characterizing embodiment of the present invention is depicted in FIG. 5.

With respect to the present invention, the DSL communication system S comprises the following functional blocks:
  a communication adaptation module CAM,
  a transceiver unit RT2,
  a data communication network DCN.

The communication adaptation module CAM is coupled to the transceiver unit RT2 via the data communication network DCN.

With respect to the present invention, the communication adaptation module CAM comprises the following functional blocks:
  the previously described power control unit PC, which
    comprises the previously described agents A1 to A3,
  a communication means COM1,
  an input/output port I/O1.

The first agent A1 is coupled to the second agent A2 and to the communication means COM1. The second agent A2 is coupled to the third agent A3. The third agent A3 is coupled to the first agent A1. The communication means COM1 is coupled to the input/output port I/O1.

The input/output port I/O1 accommodates the necessary means for encoding and transmitting data over the data communication network DCN, and for receiving and decoding data from the data communication network DCN.

The communication means COM1 accommodates the necessary means for communicating via the data communication network DCN with a transceiver unit, and for checking the integrity of the messages exchanged over the data communication network DCN.

More specifically, the communication means COM1 is adapted to receive from a transceiver unit the channel information IR necessary for computing the operational transmit powers of this transceiver unit, and to forward them to the first agent A1.

The communication means COM1 is further adapted to send to a transceiver unit the operational transmit powers $S_{1,1}$ to $S_{1,K}$ as determined by the power control unit PC for this transceiver unit.

With respect to the present invention, the transceiver unit RT2 comprises the following functional blocks:
  the previously described transmitter unit TX,
  the previously described receiver unit RX,
  the previously described hybrid circuit H,
  the previously described line adaptator T,
  a communication means COM2,
  an input/output port I/O2.

The transmitter unit TX and the receiver unit RX are both coupled to the hybrid circuit H. The hybrid circuit H is coupled to the line adaptator T. The communication means COM2 is coupled to the transmitter unit TX, to the receiver unit RX and to the input/output port I/O2.

The input/output port I/O2 accommodates the necessary means for encoding and transmitting data over the data communication network DCN, and for receiving and decoding data from the data communication network DCN.

The communication means COM2 accommodates the necessary means for communicating via the data communication network DCN with a communication adaptation module, and for checking the integrity of the messages exchanged over the data communication network DCN.

More specifically, the communication means COM2 is adapted to forward the necessary channel information IR, as reported by a peer transceiver unit, to a communication adaptation module for further processing.

The communication means COM2 is further adapted to receive from a communication adaptation module the operational transmit powers $S_{1,1}$ to $S_{1,K}$, and to forward them to the transmitter unit TX.

In one embodiment of the present invention, the communication adaptation module CAM is housed by a network manager, and is coupled to the transceiver units via a WAN, such as an ATM network.

In another embodiment, the communication adaptation module CAM is mounted on a card and plugged into a card slot of a Digital Subscriber Line Access Multiplexer (DSLAM). The communication adaptation module CAM is coupled to the DSLAM's transceiver units via a local bus, such as an Ethernet bus, and to the remotely deployed transceiver units via their respective link to the DSLAM.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for determining at least one operational transmit power ($S_{1,1}$ to $S_{1,K}$) over a physical channel (L1) for respective ones of at least one tone ($f_1$ to $f_K$),
characterized in that said method comprises the steps of:
determining a transmit power over said physical channel for each individual tone of said at least one tone such that said transmit power maximizes a weighted function of a data rate achievable over said physical channel and over said individual tone, and at least one concurrent data rate achievable over respective ones of at least one modeled neighboring channel ($C_2$ to $C_N$) and over said individual tone, with the constraint that said transmit power conforms to a transmit power mask,
determining from the determined transmit power a total data rate ($B_1$) achievable over said physical channel and over said at least one tone, and at least one total concurrent data rate ($B_2$ to $B_N$) achievable over respective ones of said at least one modeled neighboring channel and over said at least one tone,
adjusting each weight ($w_1$ to $w_N$) of said weighted function such that said at least one total concurrent data rate is greater than or equal to respective ones of at least one target data rate ($BT_2$ to $BT_N$), and such that said total data rate is maximized, with the constraint that each weight of said weighted function is identical over said at least one tone,
thereby determining by iteration said at least one operational transmit power.

2. A method according to claim 1, characterized in that the step of determining said transmit power is restricted to a pre-determined discrete set of data rates as enforced by a coding and/or modulation scheme used over said channel.

3. A method according to claim 1, characterized in that said weighted function is a weighted sum.

4. A transceiver unit (RT1) comprising:
a transmitter unit (TX) adapted to transmit at least one tone ($f_1$ to $f_K$) over a physical channel (L1),
a power control unit (PC) coupled to said transmitter unit, and adapted to determine at least one operational transmit power ($S_{1,1}$ to $S_{1,K}$) over said physical channel for respective ones of said at least one tone,
characterized in that said power control unit comprises:
a first agent (A1) adapted to determine a transmit power over said physical channel for each individual tone of said at least one tone such that said transmit power maximizes a weighted function of a data rate achievable over said physical channel and over said individual tone, and at least one concurrent data rate achievable over respective ones of at least one modeled neighboring channel ($C_2$ to $C_N$) and over said individual tone, with the constraint that said transmit power conforms to a transmit power mask,
a second agent (A2) coupled to said first agent, and adapted to determine therefrom a total data rate ($B_1$) achievable over said physical channel and over said at least one tone, and at least one total concurrent data rate ($B_2$ to $B_N$) achievable over respective ones of said at least one modeled neighboring channel and over said at least one tone,
a third agent (A3) coupled to said first agent and to said second agent, and adapted to adjust each weight ($W_1$ to $W_N$) of said weighted function such that said at least one total concurrent data rate is greater than or equal to respective ones of at least one target data rate ($BT_2$ to $BT_N$), and such that said total data rate is maximized, with the constraint that each weight of said weighted function is identical over said at least one tone,
thereby determining by iteration said at least one operational transmit power.

5. A transceiver unit according to claim 4, characterized in that said first agent is further adapted to restrict determination of said transmit power to a pre-determined discrete set of data rates as enforced by a coding and/or modulation scheme used over said channel.

6. A transceiver unit according to claim 4, characterized in that said weighted function is a weighted sum.

7. A transceiver unit according to claim 4, characterized in that said transceiver unit is a digital subscriber line (xDSL) transceiver unit.

8. A digital communication system (S) comprising:
at least one transceiver unit (RT2),
a communication adaptation module (CAM) coupled to said at least one transceiver unit via a data communication network,
each of said at least one transceiver unit comprising:
a transmitter unit (TX) adapted to transmit at least one tone ($f_1$ to $f_K$) over a physical channel (L1),
said communication adaptation module comprising:
a power control unit (PC) adapted to determine at least one operational transmit power ($S_{1,1}$ to $S_{1,K}$) over said physical channel for respective ones of said at least one tone,
characterized in that said power control unit comprises:
a first agent (A1) adapted to determine a transmit power over said physical channel for each individual tone of said at least one tone such that said transmit power maximizes a weighted function of a data rate achievable over said physical channel and over said individual tone, and at least one concurrent data rate achievable over respective ones of at least one modeled neighboring channel ($C_2$ to $C_N$) and over said individual tone, with the constraint that said transmit power conforms to a transmit power mask,
a second agent (A2) coupled to said first agent, and adapted to determine therefrom a total data rate ($B_1$) achievable over said physical channel and over said at least one tone, and at least one total concurrent data rate ($B_2$ to $B_N$) achievable over respective ones of said at least one modeled neighboring channel and over said at least one tone,
a third agent (A3) coupled to said first agent and to said second agent, and adapted to adjust each weight ($W_1$ to $W_N$) of said weighted function such that said at least one total concurrent data rate is greater than or equal to respective ones of at least one target data rate ($BT_2$ to $BT_N$), and such that said total data rate is maximized, with the constraint that each weight of said weighted function is identical over said at least one tone,
thereby determining by iteration said at least one operational transmit power.

9. A digital communication system according to claim 8, characterized in that said first agent is further adapted to restrict determination of said transmit power to a pre-determined discrete set of data rates as enforced by a coding and/or modulation scheme used over said channel.

* * * * *